(12) United States Patent
Dhekane

(10) Patent No.: US 9,300,172 B2
(45) Date of Patent: Mar. 29, 2016

(54) DONUT STATOR CORE-FRAME ATTACHMENT TECHNIQUE

(71) Applicant: Manish P. Dhekane, Orlando, FL (US)

(72) Inventor: Manish P. Dhekane, Orlando, FL (US)

(73) Assignee: SIEMENS ENERGY, INC, Orlando, FL (US)

( * ) Notice: Subject to any disclaimer, the term of this patent is extended or adjusted under 35 U.S.C. 154(b) by 280 days.

(21) Appl. No.: 14/132,011

(22) Filed: Dec. 18, 2013

(65) Prior Publication Data
US 2015/0171670 A1 Jun. 18, 2015

(51) Int. Cl.
*H02K 1/06* (2006.01)
*H02K 1/12* (2006.01)
*H02K 1/18* (2006.01)

(52) U.S. Cl.
CPC . *H02K 1/12* (2013.01); *H02K 1/187* (2013.01)

(58) Field of Classification Search
CPC .................................. H02K 1/187; H02K 1/12
USPC ..................................... 310/216.008, 216.009
See application file for complete search history.

(56) References Cited

U.S. PATENT DOCUMENTS

| 4,634,909 | A | * | 1/1987 | Brem | ............... | H02K 15/024 |
| | | | | | | 310/433 |
| 5,875,540 | A | | 3/1999 | Sargeant | | |
| 7,202,587 | B2 | | 4/2007 | Sargeant | | |
| 7,652,986 | B2 | * | 1/2010 | Nagesh | ............... | H04L 45/00 |
| | | | | | | 370/226 |
| 9,190,890 | B2 | * | 11/2015 | Allen | ............... | H02K 15/006 |
| | | | | | | 29/596 |

* cited by examiner

*Primary Examiner* — Hanh Nguyen

(57) ABSTRACT

A technique for securing a group of stator packs that are part of a stator core to construction bolts associated with a generator frame. The technique includes using a single wedge set to secure the group of stator packs to each construction bolt. Each wedge set includes a solid filler piece positioned within a groove on one side of a notch in the stator pack and a construction bolt filler piece having a convex shape portion configured to the shape of the construction bolt that accepts the construction bolt. A wedge member is forced between the filler pieces to secure the group of stator packs to the construction bolt.

17 Claims, 3 Drawing Sheets

DONUT STATOR CORE-FRAME ATTACHMENT TECHNIQUE

BACKGROUND OF THE INVENTION

1. Field of the Invention

This invention relates generally to a technique for mounting a stack of stator core plates to construction bolts associated with an inner frame of a high power generator and, more particularly, to a technique for mounting stator plate packs to construction bolts associated with an inner frame of a high voltage generator, where the technique employs a single wedge set positioned within each mounting slot in the stator pack and provided on one side of each construction bolt positioned within the slot.

2. Discussion of the Related Art

High voltage generators for generating electricity as a power source are well known in the art. A power plant may include a gas turbine engine that rotates a shaft by combusting fuel and air in a combustion chamber to generate a working fluid that expands across blades that rotate, and in turn causes the shaft to rotate. The shaft of such an engine is coupled to an input shaft of a high voltage generator that is mounted to a rotor having a special configuration of coils. An electrical current provided in the rotor coils generates a magnetic flux around the coils, and as the rotor rotates, the magnetic flux interacts with windings in a stator core enclosing the rotor. The stator core windings may include interconnected stator bars that have a special configuration to reduce eddy currents in the core, which would otherwise generate significant heat and possibly damage various generator components.

A stator core for a high voltage generator is typically a stacked assembly of several thousand laminations of a relatively thin ferrous material, such as iron or steel. Each lamination is formed by configuring a plurality of pie-shaped plate sections, such as nine sections, to form a laminate plate ring, where each section is stamped from a piece of the ferrous material. A number of these laminate plate rings are then stacked on top of each of other within a fixture where they are compressed together. The compressed stack of laminate plate rings are placed in a vacuum chamber where a resin is used to secure the rings together and where the resin is cured in a heated oven. The resulting stack of plate rings forms a single unit often referred to as a stator pack or donut. The stator packs are then assembled together to form the stator core in a generator frame by sliding each stator pack onto a plurality of construction or building bolts circumferentially disposed around an inner bore of the frame. Once all of the stator packs are mounted within the generator frame, a series of through-bolts extend through aligned openings in the stator pack which are used to compress the stator packs together to form the final stator core. U.S. Pat. No. 5,875,540 issued to Sargeant et al., assigned to the assignee of this invention and herein incorporated by reference, provides a more detailed discussion of the stator core assembly process discussed above.

In one stator core assembly operation, the stator packs are slid onto the construction bolts and supported by a series of notches circumferentially disposed around the stator packs, where a plurality of stator packs, such as four or five stator packs, are secured to the construction bolts using opposing wedge sets on each side of the construction bolt. Each wedge set includes opposing outer filler members and an internal wedge member where the wedge member is forced between the filler members to securely hold the stator pack to the construction bolts. A typical stator core may have eighteen construction bolts, thus requiring thirty six wedge sets to secure the group of four or five stator packs to the construction bolts during assembly, where the stator core may include 30-35 stator packs and have a length of about 200 inches.

The process of assembling the stator core of a high voltage generator is sometimes performed at the final installation site of the generator because of the assembled size of the stator core. Assembly of the generator at the final installation site requires tight scheduling controls and procedures as a result of the size of the generator and the space requirements necessary. Positioning thirty-six wedge sets for each group of the stator packs, where several groups of the stator packs make up the stator core, is labor intensive and requires significant time. Any unforeseen delays or other issues during assembly of the stator core affects the entire assembly schedule, which has significant effects on cost.

SUMMARY OF THE INVENTION

In accordance with the teachings of the present invention, a technique for securing a group of stator packs that are part of a stator core to construction bolts associated with a generator frame is disclosed. The technique includes using a single wedge set to secure the group of stator packs to each construction bolt. Each wedge set includes a solid filler piece positioned within a groove on one side of a notch in the stator pack and a construction bolt filler piece having a convex shape portion configured to the shape of the construction bolt that accepts the construction bolt. A wedge member is forced between the filler pieces to secure the group of stator packs to the construction bolt.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for securing a group of stator packs to construction bolts in a high voltage generator frame using a single wedge set for each bolt is merely exemplary in nature, and is in no way intended to limit the invention or its applications or uses.

Figure 1:
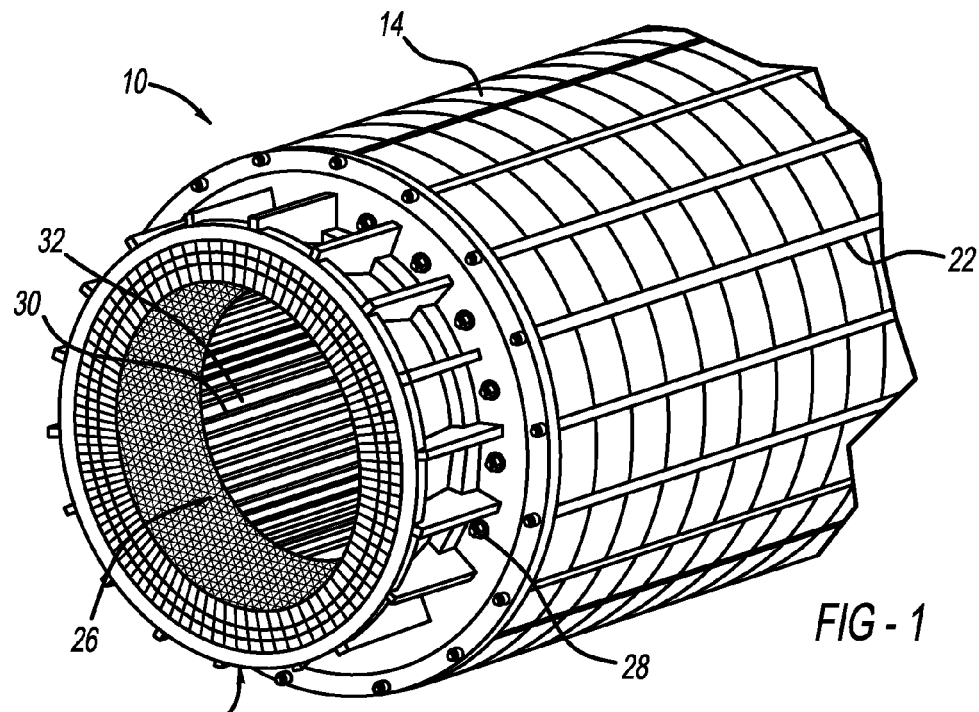
FIG. 1 is a cut-away, perspective view of a stator core for a high voltage generator.
Figure 2:
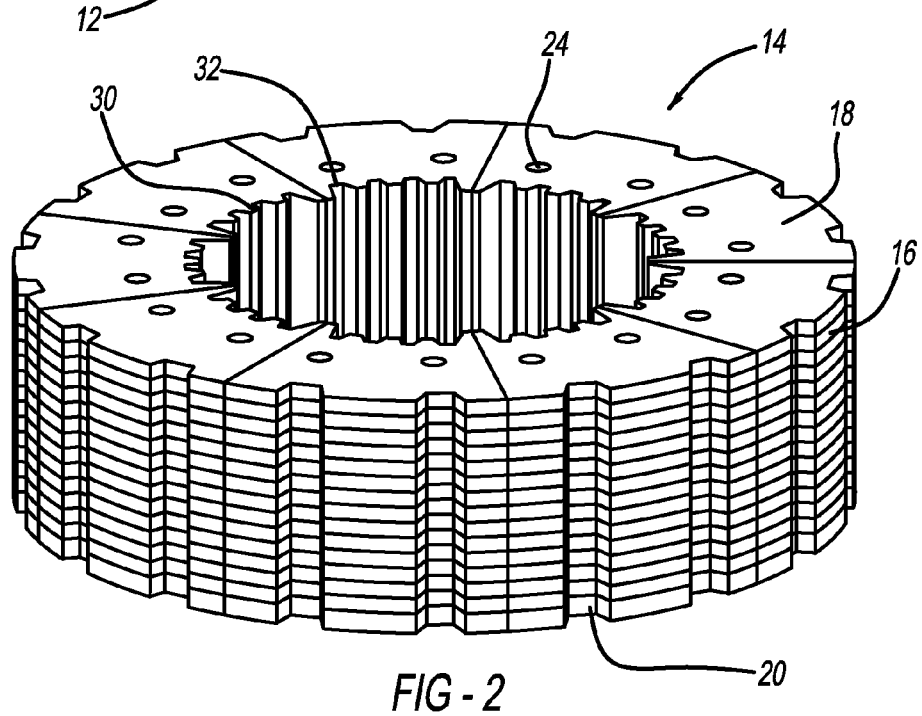
FIG. 2 is an isometric view of a stator pack including a plurality of laminate plates.

FIG. 1 is a cut-away perspective view of a stator core 10 for a high voltage generator, where the core 10 is shown separated from an inner frame of the generator. The stator core 10 includes a plurality of stacked stator packs 14, where a perspective view of one of the stator packs 14 separated from the stator core 10 is shown in FIG. 2. An end unit 12 is mounted to each end of the stack of the stator packs 14, where the end unit 12 and the stator packs 14 define an internal bore 26 in which a rotor (not shown) is positioned in a manner well understood by those skilled in the art.

Each of the stator packs 14 is an assembly of several laminate plate rings 16 each being formed by a plurality of pie-shaped plate sections 18 to form the stator pack 14 in the manner, for example, discussed above. Each of the stator packs 14 includes a series of circumferentially disposed notches 20 that accept construction bolts 22 during assembly of the stator core 10, as will be discussed in more detail below. Each of the stator packs 14 also includes a plurality of bores 24 where the bores 24 for all of the stator packs 14 are be aligned with each other to accept through bolts 28 that compress and hold the stator packs 14 together to form the stator core 10. Further, the plate sections 18 that make up the stator packs 14 are stamped to define a series of stator core teeth 30 defining slots 32 in which stator windings (not shown) are provided as part of the stator core 10.

Figure 3:
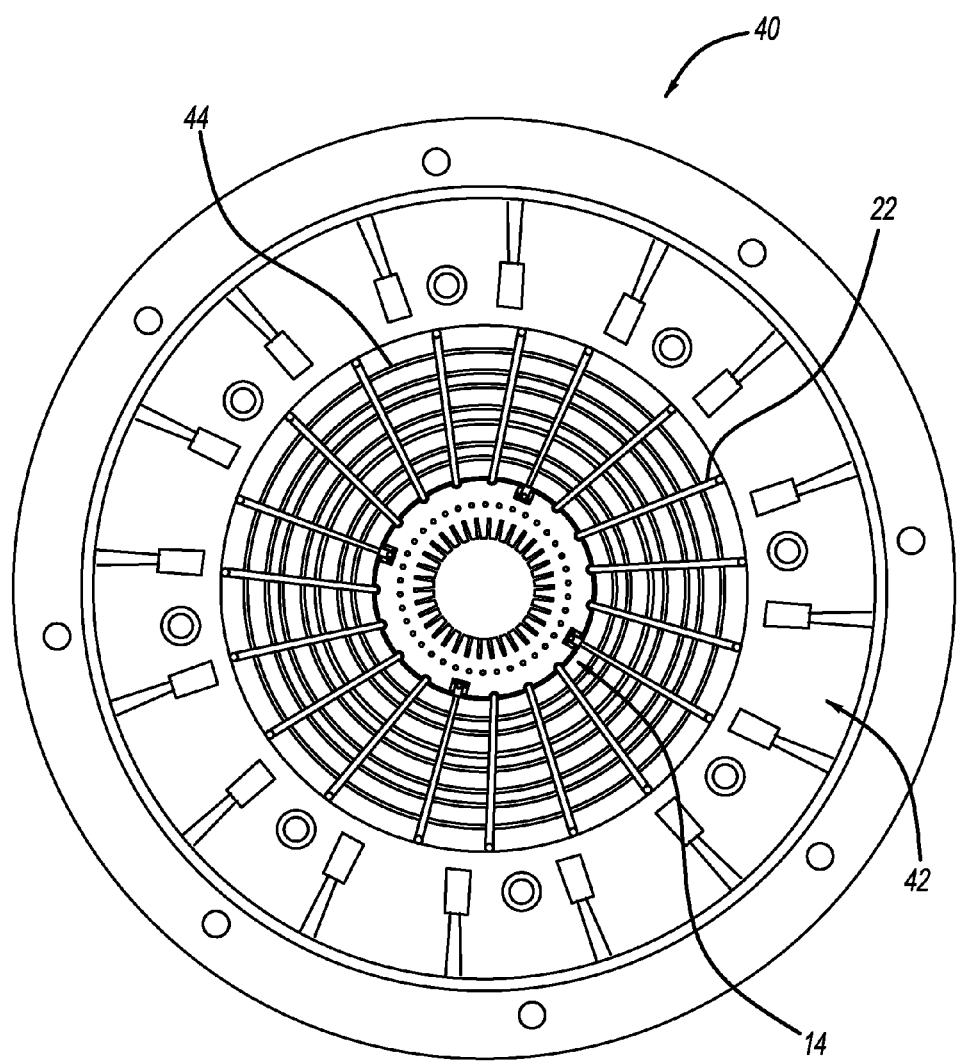
FIG. 3 is a front isometric view showing stator packs being mounted to a generator frame.

FIG. 3 is a front isometric view of a generator frame 40 including an internal bore 42 showing how the stator core 10 is assembled. The construction bolts 22 are positioned around the bore 42 and are mounted to annular ribs 44, where the bolts 22 are positioned within the notches 20 in the stator packs 14 during the assembly process. During assembly, workers, using appropriate equipment and machines (not shown), will align and slide the notches 20 in the stator packs 14 onto the construction bolts 22 from one end of the bore 42 to the other end of the bore 42. Once a predetermined group, for example, four or five, of the stator packs 14 have been inserted into the bore 42 and are positioned adjacent to each other, a number of wedge sets are used to secure that group of the stator packs 14 to the construction bolts 22 so that each of the groups of the stator packs 14 are secured to the bolts 22 with separate wedge sets.

Figure 4:
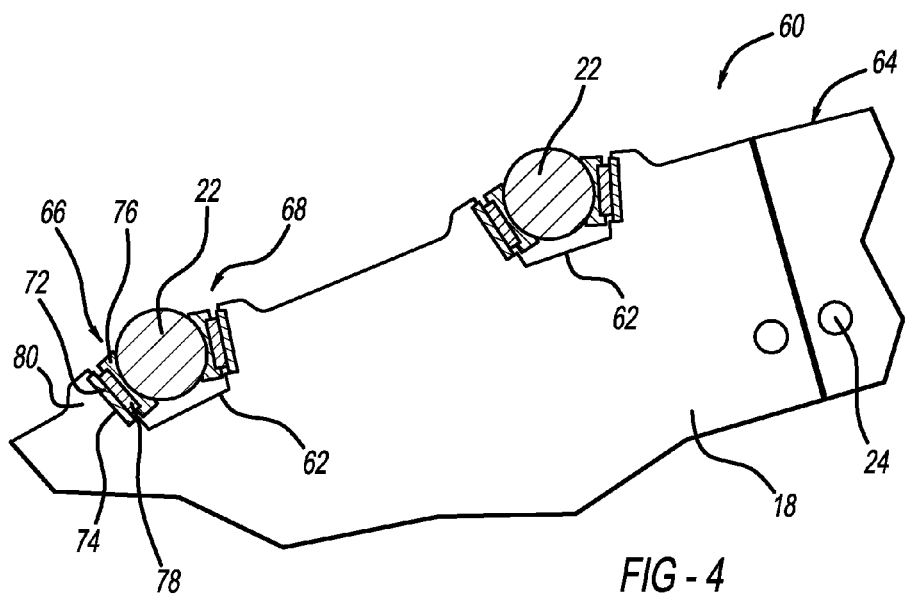
FIG. 4 is a cut-away front view of a portion of a known stator pack showing a pair of wedge sets positioned within a pack notch for securing the stator pack to construction bolts.

FIG. 4 is a cut-away front view of a portion of a known stator pack 60 including plate rings 64 of the type discussed above, where like elements to those discussed above are identified with same reference number. The stator pack 60 includes a series of circumferentially disposed notches 62 that accept the construction bolts 22 during assembly of the generator. Two wedge sets 66 and 68 are provided within each notch 62 on opposite sides of the particular construction bolt 22 and are used to secure a group of the stator packs 60 to the construction bolts 22. Each wedge set 66 and 68 includes a solid filler piece 72 positioned within a groove 74 formed in a raised portion 80 on one side of the notch 62 and a construction bolt filler piece 76 having a convex shaped portion configured to the shape of the construction bolt 22 and positioned on an opposite side of the notch 62. A tapered wedge member 78 is positioned between the filler pieces 72 and 76 and is forced between the filler pieces 72 and 76 in a manual securing operation that tightens the wedge sets 66 and 68 against both sides of the construction bolt 22. By providing the two wedge sets 66 and 68 in each notch 62 for each of the several circumferentially disposed bolts 22 the group of the stator packs 60 being mounted to the bolts 22 are tightly secured thereto.

As discussed above, each laminate plate ring 16 is formed of a series of the thin ferrous plate sections 18 that are stamped in a metal forming process to have the desired shape, where each section 18 includes the appropriate number of the outer notches and the inner stator bar slots. During the stamping process for providing each plate section 18, the stamping die is configured so that the stamped piece includes the appropriate shaped notch to accept the wedge set. According to the invention, that stamping process is altered to provide the notches to be shaped where one side of the notch has a groove that accepts the solid filler piece of the wedge set and an opposite side of the notch has a convex shape to conform to the shape of the construction bolt.

Figure 5:
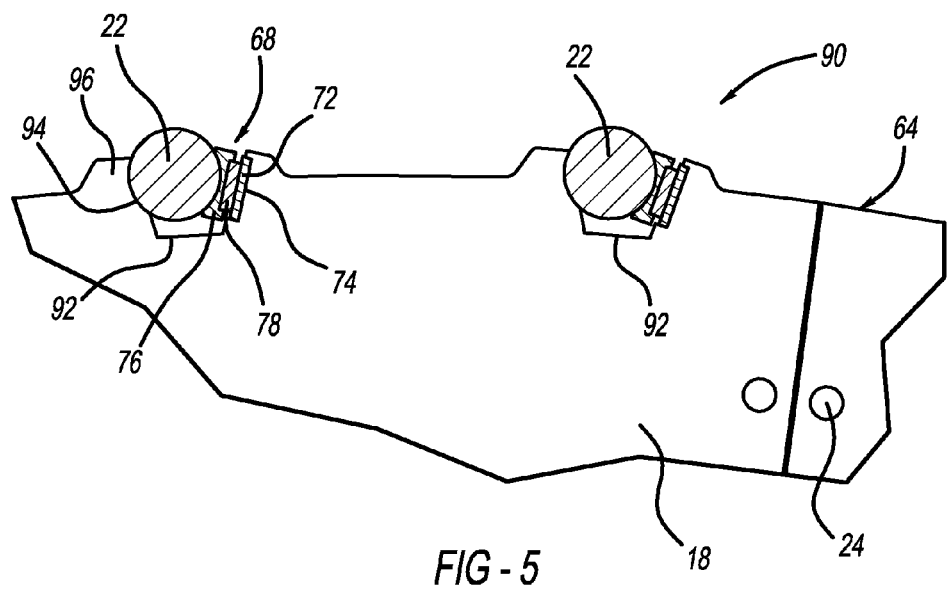
FIG. 5 is a cut-away front view of a portion of a stator pack showing a single wedge set positioned within a pack notch for securing the stator pack to construction bolts.

FIG. 5 is a cut-away front view of a stator pack 90, having the new notch design, where like elements to the stator pack 60 are identified by the same reference number. Particularly, each plate section 18 includes a notch 92 having opposing sides where one side is formed to have the groove 74 that accepts the solid filler piece 72 of the wedge set 68 and the other side is formed to have a convex shaped portion 94 that conforms to the shape of the construction bolt 22. Because one of the wedge sets is eliminated, the width of the notch 92 is narrower than the width of the notch 62, which is illustrated by raised portion 96. Thus, only a single wedge set is necessary for each notch 92 to secure the group of the stator packs 90 to the construction bolts 22, which results in half of the number of wedge sets being used to assemble the generator.

By reducing the number of the wedge sets that are required to be installed, the amount of labor required to assemble the stator core 10 is significantly reduced. Further, by reducing the size of the notches 92 in the plate section 18 from what was heretofore necessary to support two wedge sets, the amount of ferrous material in the plate pack 90 is increased, which increases the magnetic performance of the stator core 10 and the performance of the generator. Also, in the known design that required two wedge sets per notch, the installation process for providing both wedge sets can be complicated as a result of the construction bolts 22 typically being uneven where the wedge sets did not always fit in the desired manner. Because the invention only employs a single wedge set on one side of the construction bolt 22 for each group of the stator packs 90, misalignment of the construction bolts 22 is more easily addressed.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A generator comprising:
  a frame including a bore and a plurality of circumferentially disposed construction bolts mounted around and extending within the bore;
  a plurality of stacked stator packs defining a stator core, each stator pack including a plurality of circumferentially disposed notches around an outer perimeter of the stator pack that align with notches in the other stator packs and form slots extending the length of the stator core, each notch including opposing side walls where one of the side walls is shaped to conform to the construction bolt in a mating engagement and the other sidewall includes a groove; and
  a plurality of wedge sets for mounting the stator packs to the construction bolts, each wedge set including a solid filler piece configured to be positioned within the groove and a construction bolt filler piece having a shaped portion that conforms to the construction bolt, said wedge set further including a wedge piece positioned between the filler pieces and forcing the filler pieces apart to secure the stator packs to the construction bolt, wherein a single wedge set is provided within each notch.

2. The generator according to claim 1 wherein each wedge set secures four or five stator packs to the construction bolt.

3. The generator according to claim 1 wherein the stator packs are formed from a series of stacked rings where each ring includes a plurality of ring sections.

4. The generator according to claim 3 wherein the ring sections are stamped from a ferrous plate.

5. The generator according to claim 4 wherein the ferrous plate is a steel plate.

6. The generator according to claim 1 wherein the plurality of circumferentially disposed construction bolts is eighteen construction bolts.

7. The generator according to claim 1 wherein each stator pack includes an internal bore defining stator teeth and stator slots for accepting stator windings.

8. The generator according to claim 1 wherein each stator pack includes a raised portion proximate the notch.

9. The generator according to claim 1 wherein the generator is a high voltage generator configured to be coupled to a gas turbine engine.

10. The generator according to claim 1 wherein the generator includes thirty to thirty five stator packs.

11. A stator plate for a generator, said stator plate comprising a plurality of circumferentially disposed notches around an outer perimeter of the stator plate, each notch including opposing side walls where one of the side walls is shaped to conform to a cylindrical construction bolt and the other sidewall includes a rectangular groove.

12. The stator plate according to claim 11 wherein the groove is configured to accept a solid filler piece associated with a wedge set that secures the stator plate to the construction bolt.

13. A high voltage generator comprising:
a frame including a bore and a plurality of circumferentially disposed construction bolts mounted around and extending within the bore;
a plurality of stacked stator packs defining a stator core, said stator packs being formed from a series of stacked rings where each ring includes a plurality of ring sections where the ring sections are stamped from a ferrous plate, each stator pack including a plurality of circumferentially disposed notches around an outer perimeter of the stator pack that align with notches in the other stator packs and form slots extending the length of the stator core, each notch including opposing side walls where one of the side walls is shaped to conform to the construction bolt in a mating engagement and the other sidewall includes a groove, wherein each stator pack includes a raised portion proximate the notch; and
a plurality of wedge sets for mounting the stator packs to the construction bolts, each wedge set including a solid filler piece configured to be positioned within the groove and a construction bolt filler piece having a shaped portion that conforms to the construction bolt, said wedge set further including a wedge piece positioned between the filler pieces and forcing the filler pieces apart to secure the stator packs to the construction bolt, wherein a single wedge set is provided within each notch.

14. The generator according to claim 13 wherein each wedge set secures four or five stator packs to the construction bolt.

15. The generator according to claim 13 wherein the plurality of circumferentially disposed construction bolts is eighteen construction bolts.

16. The generator according to claim 13 wherein each stator pack includes an internal bore defining stator teeth and stator slots for accepting stator windings.

17. The generator according to claim 13 wherein the generator includes thirty to thirty five stator packs.

\* \* \* \* \*